United States Patent
Boittin

(10) Patent No.: US 8,915,789 B2
(45) Date of Patent: Dec. 23, 2014

(54) SHAFT SHIELDING ASSEMBLY

(75) Inventor: Philippe Boittin, Laboissiere en Thelle (FR)

(73) Assignee: AGCO SA, Beauvais (FR)

( * ) Notice: Subject to any disclaimer, the term of this patent is extended or adjusted under 35 U.S.C. 154(b) by 29 days.

(21) Appl. No.: 13/511,394

(22) PCT Filed: Nov. 12, 2010

(86) PCT No.: PCT/EP2010/067409
§ 371 (c)(1),
(2), (4) Date: Jan. 9, 2013

(87) PCT Pub. No.: WO2011/061127
PCT Pub. Date: May 26, 2011

(65) Prior Publication Data
US 2013/0102400 A1   Apr. 25, 2013

(30) Foreign Application Priority Data

Nov. 23, 2009 (GB) .................................. 0920419.9

(51) Int. Cl.
F16C 1/26 (2006.01)
F16D 3/84 (2006.01)
F16P 1/04 (2006.01)
A01B 71/08 (2006.01)

(52) U.S. Cl.
CPC . *A01B 71/08* (2013.01); *F16D 3/84* (2013.01); *F16P 1/04* (2013.01); *F16D 3/841* (2013.01)
USPC ........................................................ 464/172

(58) Field of Classification Search
USPC ............... 464/172, 177; 74/609; 56/DIG. 24; 29/897.1, 455.1; 403/348, 349
See application file for complete search history.

(56) References Cited

U.S. PATENT DOCUMENTS

| 1,253,108 A |   | 1/1918 | Taylor |
| 2,627,732 A | * | 2/1953 | Gerner ...................... 464/172 X |
| 4,696,660 A |   | 9/1987 | Murphy et al. |
| 4,702,724 A | * | 10/1987 | Vater ............................. 464/172 |
| 5,702,306 A |   | 12/1997 | Adamek et al. |
| 5,741,084 A | * | 4/1998 | Del Rio et al. ................ 403/349 |

FOREIGN PATENT DOCUMENTS

| EP | 1089005 | 4/2011 |
| GB | 2045884 A | 11/1980 |
| WO | WO-9419923 A1 | 9/1994 |

OTHER PUBLICATIONS

International Search Report for International Application No. PCT/EP2010/067409 Dated Apr. 2, 2011 UK Search Report for UK Application No. 0920419.9 Dated Mar. 9, 2012.

* cited by examiner

*Primary Examiner* — Gregory Binda

(57) ABSTRACT

A shaft shielding assembly (26) comprising first and second telescopic sleeve members (31, 32) is provided. The sleeve members are each disposed around, and shield a portion of a rotatable shaft (22). Mutually cooperating guide means, such as an array of grooves and ridges (33, 34), are provided on the sleeve members and which forcibly reduce longitudinal overlap therebetween when rotated with respect to one another so as to extend the shielded region of the shaft.

3 Claims, 4 Drawing Sheets

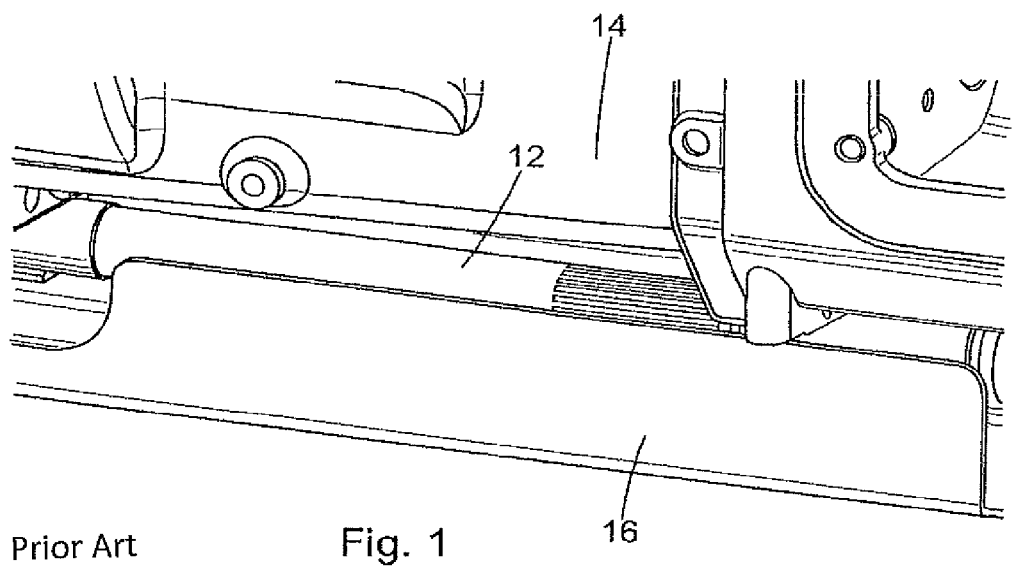
Prior Art    Fig. 1
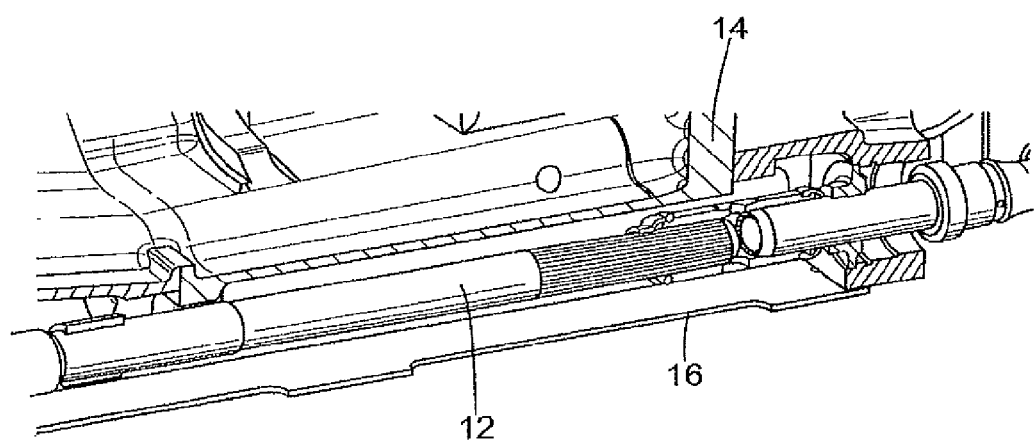
Prior Art    Fig. 2

SHAFT SHIELDING ASSEMBLY

BACKGROUND OF THE INVENTION

1. Field of Invention

The invention relates to shielding apparatus for rotating shafts which serve as safety guards and/or covers to prevent the ingress of dust and dirt into rotating parts. In particular the invention relates to the shielding of rotating shafts on vehicles such as drive shafts which serve to transmit torque from an engine. The invention also relates to a method of assembling a shielded shaft of the kind described above.

2. Description of Related Art

Guards are often provided on the outside of vehicles to prevent operators coming into contact with moving parts on safety grounds. This applies to rotating drive shafts which are present on the underside of many vehicles, such as agricultural tractors, wherein torque is transmitted from an engine to a gearbox or from a front axle to a rear axle for example. Health and safety legislation in a number of jurisdictions dictate that guard apparatus must be provided as a necessity.

In addition to improving safety the guard can also serve to reduce exposure of the shaft to dust and dirt. In the case of agricultural tractors the guard may shield a drive shaft from windrows of hay which may come into contact with underside of the tractor. Without the guard in place hay may become wrapped around the drive shaft eventually leading to failure thereof.

FIGS. 1, 2 and 3 show a known shaft shielding assembly fixed to the underside of a tractor. A drive shaft 12 extends longitudinally underneath the frame 14 of the tractor between the rear axle (not shown) and the front axle (also not shown). The drive shaft 12 delivers torque from the rear axle to the differential of a front axle to provide four-wheel drive.

The guard element 16 is of substantially U-shaped construction and is bolted by bolts 17 to the underside of the frame 14 or to the rear axle and thereby being secured in position. A window 18 is provided in the underside of the guard 16 to prevent build up of dust in the channel The guard element 16 is secured in position at a late stage of assembly to enable easy access to the drive shaft and surrounding components.

SUMMARY OF THE INVENTION

It is one object of the invention to provide an improved shaft shielding assembly which reduces the total installation time required.

It is a further object of the invention to provide a shaft shielding assembly which is cheaper to fabricate.

In accordance with a first aspect of the invention there is provided a shaft shielding assembly comprising first and second telescopic sleeve members which are each disposed around, and shield a portion of, a rotatable shaft, the sleeve members comprising mutually cooperating guide means which forcibly reduce longitudinal overlap between the sleeve members when rotated with respect to one another so as to extend the shielded region of the shaft.

Such an assembly reduces total assembly time by avoiding the need to bolt a separate guard element at a late stage thereof. The sleeve members can be conveniently positioned upon the shaft at an early stage of assembly and simply extended by a twisting action when required.

At least one of the sleeve members may be tapered in the longitudinal direction which causes surface friction between the two members when forced apart in a telescoping action. Said surface friction serves to hold the two sleeve members in position relative to one another.

The guide means preferably comprises a threaded region which tightens engagement as the longitudinal overlap is reduced. The threaded region forces the two sleeve members longitudinally apart when twisted relative to one another. When combined with a taper in the diameter of at least one of the respective members, the resulting surface friction holds them in position.

The guide means are preferably cast or moulded into the sleeve members and, preferably further still, the sleeve members are formed of plastic. Advantageously, this delivers a significant cost saving compared to existing shaft shielding assemblies which are made from steel.

The guide means may comprise ridges and grooves which cooperate with one another. Again these may be formed by moulding in to a plastic component.

In a preferred embodiment the shaft shielding assembly is fitted to a vehicle comprising a driveshaft which delivers torque between an engine and wheels. The outermost ends of the sleeve members preferably engage with a fixing element around the ends of the drive shaft when the shield is fully extended so as to secure the shield in position. The fixing element may simply comprise an annular groove into which the outer most ends of the sleeve members simply fit. In addition to providing a secure safety guard, such an arrangement effectively seals the drive shaft from the surrounding environment. Advantageously, this prevents the ingress of dust and dirt into the rotating shaft and associated bearings.

The invention is particularly applicable to tractors which comprise a driveshaft running longitudinally and which delivers torque from a transmission to a front axle to provide four-wheel drive.

In accordance with a second aspect of the invention there is provided a method of assembling a shielded shaft comprising the steps of: locating a shield on a shaft, the shield comprising first and second telescopic sleeve members which comprise mutually cooperating guide means, fixing the ends of the shaft to a machine so as to prevent removal of the shield from the ends of the shaft, rotating the sleeve members relative to one another so that the guide means engage and force the sleeve members apart in a longitudinal direction until the exposed parts of the shaft are shielded. Advantageously, the sleeve members can be rotated into position at a very late stage of assembly and can even be carried out manually. Not only does this simplify the assembly of the shaft shield but also provides a significant time saving compared to known assemblies.

BRIEF DESCRIPTION OF THE DRAWINGS

Further advantages of the invention will become apparent from reading the following description of a specific embodiment with reference to the appended drawings in which:

FIG. 1 is a perspective view of a known shaft shielding assembly fixed to the underside of a tractor;

FIG. 2 is a sectional view of the shaft shielding assembly of FIG. 1;

DETAILED DESCRIPTION OF THE INVENTION

Figure 3:
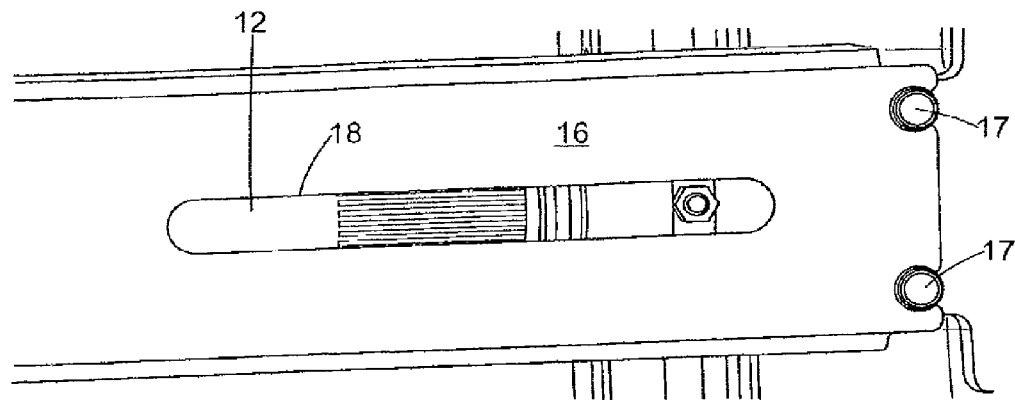
FIG. 3 is an underside view of the shaft shielding assembly of FIG. 1.
Figure 4:
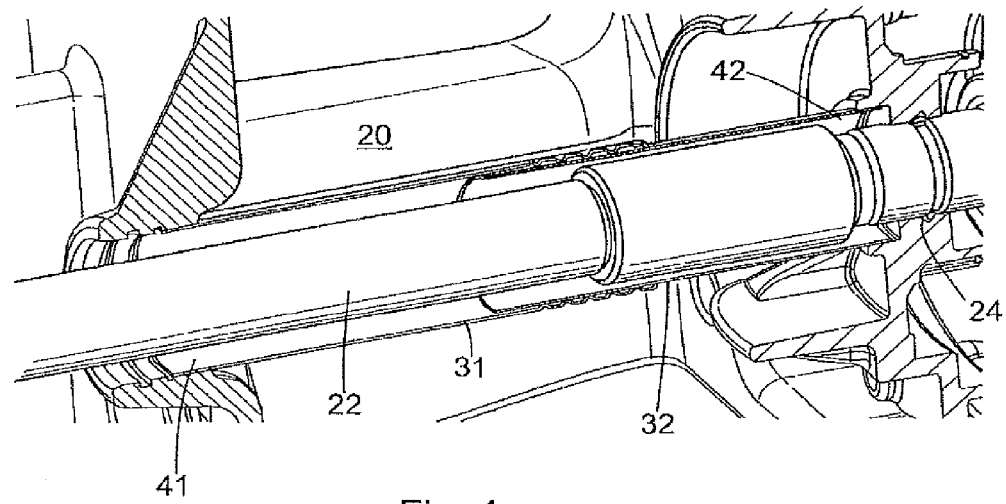
FIG. 4 is a sectional view through a shaft shielding assembly in accordance with an embodiment of the invention.

With reference to FIG. 4, a tractor comprises a chassis (designated generally by 20) and a four-wheel drive driveshaft 22 which extends longitudinally from the transmission in the rear axle (not shown) to a differential located centrally in a front axle (also not shown). The driveshaft 22 serves to deliver torque from the transmission to the front axle to provide four-wheel drive. The drive shaft 22 is supported for rotation by a bearing block 24 which is secured relative to the chassis 20.

Figure 5:
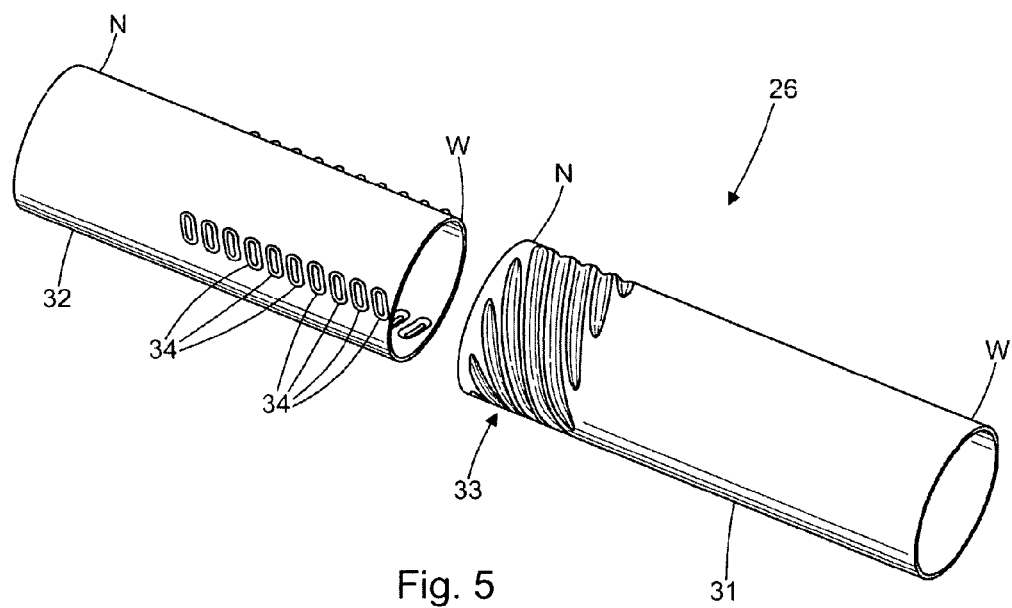
FIG. 5 is a perspective view of two sleeve members of the assembly of FIG. 4.
Figure 6:
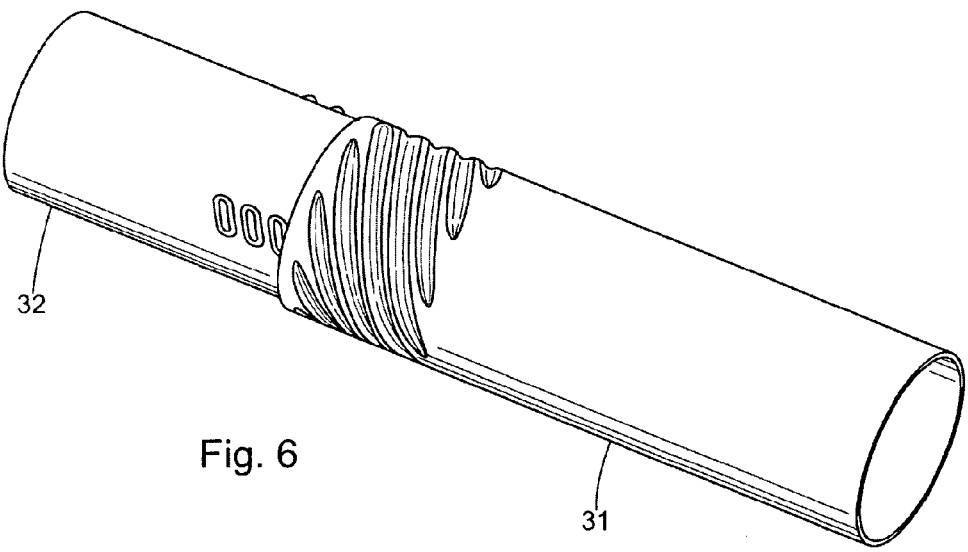
FIG. 6 is a perspective view of the two sleeve members of FIG. 5 shown with one inserted inside the other; and, FIG. 7 is a sectional view of part of the shaft shielding assembly of FIG. 4.

With reference also to FIGS. 5 and 6, a shaft shielding assembly (designated generally by 26) comprises a first sleeve member 31 and second sleeve member 32. Although not clearly apparent from the drawings, each of the sleeve members 31,32 are tapered in the longitudinal direction therefore each having a narrow end and a wide end indicated by N and W respectively in FIG. 5. Therefore, to assemble from separate components as shown in FIG. 5, the narrow end of second sleeve member 32 is inserted into the wide end of first sleeve member 31. The tapered geometry of the sleeve members 31,32 prevents complete separation by removal of second sleeve member from the narrow end of first sleeve member 31.

The first sleeve member 31 comprises a threaded region 33 which includes a regular pattern of ridges and grooves moulded into the structure of the sleeve element 31.

The second sleeve member 32 includes a number of protrusions 34 arranged in three longitudinal rows which extend for approximately two thirds of the length of the second sleeve member 32. Each protrusion 34 is substantially rectangular in shape with rounded ends and inclined at an angle which corresponds to the angle of the ridges and grooves of threaded region 33. In effect, the rows of protrusions 34 themselves provide ridges and grooves in a regularly repeating pattern in the longitudinal direction.

The protrusions 34 engage with the grooves on the inside surface of first sleeve member 31. Therefore, a manual twisting action of the first and second sleeve members 31,32 relative to one another forces a telescoping action between the two sleeve members 31,32. In effect, this telescoping action reduces the longitudinal overlap between the two sleeve members 31,32 thus lengthening the total length of the combined members.

As the two members 31,32 telescope the tapered geometry causes an increase in the surface friction between the outside surface of second sleeve member 32 and the inside surface of first sleeve member 31. This causes the threaded region to tighten in engagement as the longitudinal overlap is reduced, thereby securing the two sleeve members in position relative to one another.

During assembly of the tractor shown in FIG. 4 the two sleeve members 31,32 are located onto driveshaft 22 at an early stage and at least before securing the driveshaft 22 in position. Therefore, during subsequent assembly steps the telescopic sleeve members 31,32 rest in a loose fashion upon the drive shaft 22.

At a convenient point on the assembly line the two sleeve members 31,32 are simply manually twisted with respect to one another so as to telescope the respective members into position.

The outermost ends of sleeve members 31,32 fit into annular grooves 41,42 which are provided by the chassis 20 or any other suitable component which holds the driveshaft 22 in position. This secures the two sleeve members in position relative to the chassis 20 and prevents movement thereof. Optionally, additional securing means may be provided such as an adhesive between the sleeve members 31,32 and the annular grooves 41,42. Alternatively, or in addition to, securing screws (not shown) may be provided to hold the sleeve members 31,32 in position. Such screws may directly fix the respective sleeve members 31,32 to the chassis 20 or, alternatively, may be threaded into the overlapping region thereby preventing relative movement between the two sleeve members.

Figure 7:
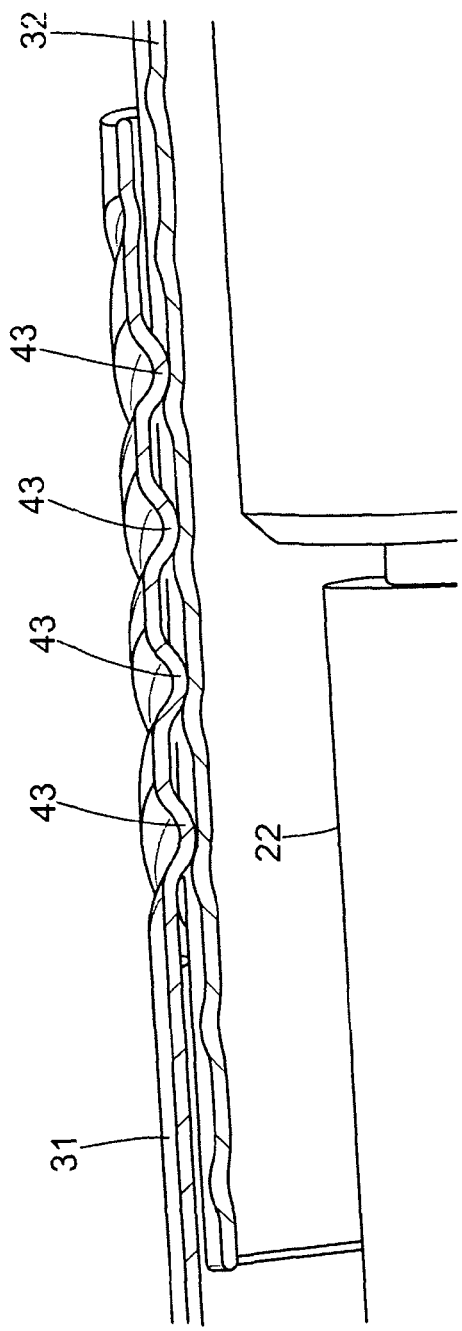

With reference to FIG. 7, the ridges 43 provided on the inside surface of first sleeve member 31 can be seen to act upon the outside surface of second sleeve member 32 in tight engagement. The surface friction between the ridges 43 and second sleeve element 32 maintains the two members in position.

In addition to providing a simple and quick means to assemble the shaft shield, the two members 31,32 provide a sealed area around the rotating shaft 22 thus preventing the ingress of dust, dirt or other material in to the supporting bearings whilst also serving as a safety guard.

It will be appreciated that the mutually cooperating guide means moulded into the structure of the sleeve members may adopt many different forms. For example, instead of discreet protrusions 34, a continuous spiral of grooves and ridges may be provided on the second sleeve member.

Although shown as implemented on an agricultural tractor the shaft shielding assembly in accordance with the invention lends itself to any rotatable shaft positioned on the outside of a machine or in any place where an operator may come into contact therewith. Therefore, it is envisaged that the shaft shielding assembly described above may be fitted to other vehicles or machinery.

By forming the sleeve members 31,32 from plastic, integrating the grooves, ridges and protrusions is extremely simple. However, other materials may be used instead whilst the mutually cooperating guide means may be provided by separate elements fixed to the surface of the sleeve members without deviating from the scope of the invention.

In summary, there is provided a shaft shielding assembly comprising first and second telescopic sleeve members. The sleeve members are each disposed around, and shield a portion of, a rotatable shaft. Mutually cooperating guide means, such as an array of grooves and ridges, are provided on the sleeve members and which forcibly reduce longitudinal overlap therebetween when rotated with respect to one another so as to extend the shielded region of the shaft.

The invention claimed is:

1. A vehicle comprising:
    a drive shaft configured to deliver torque between an engine and wheels of the vehicle;
    a shaft shielding assembly comprising:
        a first sleeve member disposed on and configured to shield a first portion of said drive shaft, said first sleeve member having a first region of ridges and grooves; and
        a second sleeve member mated with said first sleeve member with a longitudinal overlap and disposed on and configured to shield a second portion of said drive shaft, said second sleeve member having a second region of ridges and grooves engaged with said first region of ridges and grooves, wherein the first and second sleeve members are telescopically engaged such that rotation of the first sleeve member with respect to the second sleeve member causes the first and second regions of ridges and grooves to forcibly adjust the longitudinal overlap between the first and second sleeve members so as to extend or shorten the longitudinal length of the shaft shielding assembly, wherein the outermost ends of the first and second sleeve members each engage with a fixing element around ends of the drive shaft when the shaft shielding assembly is fully extended so as to secure the shaft shielding assembly in position on the drive shaft.

2. The vehicle according to claim 1 wherein the first and second sleeve members are each tapered with a wide end and a narrow end, and said tapered ends prevent separation by removal of the second sleeve member from the narrow end of the first sleeve member.

3. The vehicle according to claim 1 further comprising a chassis which holds the driveshaft in position and the fixing element comprises annular grooves in the chassis which secure the two sleeve members.

\* \* \* \* \*